United States Patent
Liu et al.

(10) Patent No.: US 7,670,468 B2
(45) Date of Patent: *Mar. 2, 2010

(54) CONTACT ASSEMBLY AND METHOD FOR ELECTROCHEMICAL MECHANICAL PROCESSING

(75) Inventors: Feng Q. Liu, San Jose, CA (US); Rashid Mavliev, Santa Clara, CA (US)

(73) Assignee: Applied Materials, Inc., Santa Clara, CA (US)

( * ) Notice: Subject to any disclaimer, the term of this patent is extended or adjusted under 35 U.S.C. 154(b) by 1203 days.

This patent is subject to a terminal disclaimer.

(21) Appl. No.: 11/228,035

(22) Filed: Sep. 15, 2005

(65) Prior Publication Data

US 2006/0032749 A1    Feb. 16, 2006

Related U.S. Application Data

(63) Continuation-in-part of application No. 10/880,752, filed on Jun. 30, 2004, which is a continuation-in-part of application No. 10/608,513, filed on Jun. 26, 2003, (Continued)

(60) Provisional application No. 60/610,930, filed on Sep. 18, 2004, provisional application No. 60/484,189, filed on Jul. 1, 2003, provisional application No. 60/516,680, filed on Nov. 3, 2003.

(51) Int. Cl.
*C25C 7/00* (2006.01)
(52) U.S. Cl. .................... 204/297.14; 204/194; 204/242
(58) Field of Classification Search ............ 204/297.14, 204/194, 242
See application file for complete search history.

(56) References Cited

U.S. PATENT DOCUMENTS 1,601,642 A    9/1926   Parker (Continued)

FOREIGN PATENT DOCUMENTS

EP    0 325 753    8/1989

(Continued)

OTHER PUBLICATIONS

Alexander, Jr., "Electrically Conductive Polymer Nanocomposite Materials", http://www.afrlhorizons.com/Briefs/Sept02/ML0206.html, Jan. 24, 2005.

(Continued)

*Primary Examiner*—Harry D Wilkins, III
*Assistant Examiner*—Zulmariam Mendez
(74) *Attorney, Agent, or Firm*—Patterson & Sheridan

(57) ABSTRACT

Embodiments of the invention generally provide a method and apparatus for processing a substrate in an electrochemical mechanical planarizing system. In one embodiment, a contact assembly for electrochemically processing a substrate includes a housing having a ball disposed in a passage formed through the housing. The ball is adapted to extend partially from the housing to contact the substrate during processing. The housing includes a fluid inlet that is positioned to cause fluid, entering the housing through the inlet, to sweep the entire passage. In another embodiment, a method for electrochemically processing includes flowing a processing fluid through a passage retaining a conductive element. The flow sweeps the entire passage of the housing. A first electrical bias is applied to the conductive element in contact with the substrate relative an electrode electrically coupled to the substrate by the processing fluid. After the substrate is separated from the conductive element, flow of processing fluid is continued through the passage past the conductive element.

18 Claims, 8 Drawing Sheets

Related U. S. Application Data now Pat. No. 7,374,644, which is a continuation-in-part of application No. 10/140,010, filed on May 7, 2002, now Pat. No. 6,979,248, said application No. 10/608,513 is a continuation-in-part of application No. 10/211,626, filed on Aug. 2, 2002, now Pat. No. 7,125,477, which is a continuation-in-part of application No. 10/033,732, filed on Dec. 27, 2001, now Pat. No. 7,066,800, which is a continuation-in-part of application No. 09/505,899, filed on Feb. 17, 2000, now Pat. No. 6,537,144, said application No. 10/608,513 is a continuation-in-part of application No. 10/210,972, filed on Aug. 2, 2002, now Pat. No. 7,303,662, which is a continuation-in-part of application No. 09/505,899, filed on Feb. 17, 2000, now Pat. No. 6,537,144, said application No. 10/608,513 is a continuation-in-part of application No. 10/151,538, filed on May 16, 2002, now abandoned, application No. 11/228,035, which is a continuation-in-part of application No. 10/244,697, filed on Sep. 16, 2002, now Pat. No. 6,991,526, which is a continuation-in-part of application No. 10/244,688, filed on Sep. 16, 2002, now Pat. No. 6,848,970, and a continuation-in-part of application No. 10/391,324, filed on Mar. 18, 2003.

(56) References Cited

U.S. PATENT DOCUMENTS

| | | |
|---|---|---|
| 1,927,162 A | 9/1933 | Fiedler et al. |
| 2,112,691 A | 3/1938 | Crowder |
| 2,240,265 A | 4/1941 | Nachtman |
| 2,392,687 A | 1/1946 | Nachtman |
| 2,431,065 A | 11/1947 | Miller |
| 2,451,341 A | 10/1948 | Jernstedt |
| 2,453,481 A | 11/1948 | Wilson |
| 2,454,935 A | 11/1948 | Miller |
| 2,456,185 A | 12/1948 | Grube |
| 2,457,510 A | 12/1948 | van Ornum |
| 2,458,676 A | 1/1949 | Brenner et al. |
| 2,461,556 A | 2/1949 | Lorig |
| 2,473,290 A | 6/1949 | Millard |
| 2,477,808 A | 8/1949 | Jones |
| 2,479,323 A | 8/1949 | Davis |
| 2,480,022 A | 8/1949 | Hogaboom |
| 2,490,055 A | 12/1949 | Hoff |
| 2,495,695 A | 1/1950 | Camin et al. |
| 2,500,205 A | 3/1950 | Schaefer |
| 2,500,206 A | 3/1950 | Schaefer et al. |
| 2,503,863 A | 4/1950 | Bart |
| 2,506,794 A | 5/1950 | Kennedy et al. |
| 2,509,304 A | 5/1950 | Klein |
| 2,512,328 A | 6/1950 | Hays |
| 2,517,907 A | 8/1950 | Mikulas |
| 2,519,945 A | 8/1950 | Twele et al. |
| 2,530,677 A | 11/1950 | Berkenkotter et al. |
| 2,535,966 A | 12/1950 | Teplitz |
| 2,536,912 A | 1/1951 | Cobertt |
| 2,539,898 A | 1/1951 | Davis |
| 2,540,175 A | 2/1951 | Rosenqvist |
| 2,544,510 A | 3/1951 | Prahl |
| 2,549,678 A | 4/1951 | Fiandt |
| 2,554,943 A | 5/1951 | Farmer |
| 2,556,017 A | 6/1951 | Vonanda |
| 2,560,534 A | 7/1951 | Adler |
| 2,560,966 A | 7/1951 | Lee |
| 2,569,577 A | 10/1951 | Reading |
| 2,569,578 A | 10/1951 | Rieger |
| 2,571,709 A | 10/1951 | Gray |
| 2,576,074 A | 11/1951 | Nachtman |
| 2,587,630 A | 3/1952 | Konrad et al. |
| 2,619,454 A | 11/1952 | Zapponi |
| 2,633,452 A | 3/1953 | Hogaboom, Jr., et al. |
| 2,646,398 A | 7/1953 | Henderson |
| 2,656,283 A | 10/1953 | Fink et al. |
| 2,656,284 A | 10/1953 | Toulmin |
| 2,657,177 A | 10/1953 | Rendel |
| 2,657,457 A | 11/1953 | Toulmin |
| 2,673,836 A | 3/1954 | Vonada |
| 2,674,550 A | 4/1954 | Dunlevy et al. |
| 2,675,348 A | 4/1954 | Greenspan |
| 2,680,710 A | 6/1954 | Kenmore et al. |
| 2,684,939 A | 7/1954 | Geese |
| 2,689,215 A | 9/1954 | Bart |
| 2,695,269 A | 11/1954 | de Witz et al. |
| 2,696,859 A | 12/1954 | Somma |
| 2,698,832 A | 1/1955 | Swanson |
| 2,706,173 A | 4/1955 | Wells et al. |
| 2,706,175 A | 4/1955 | Licharz |
| 2,708,445 A | 5/1955 | Manson et al. |
| 2,710,834 A | 6/1955 | Vrilakas |
| 2,711,993 A | 6/1955 | Lyon |
| 3,162,588 A | 12/1964 | Bell |
| 3,334,041 A | 8/1967 | Dyer et al. |
| 3,433,730 A | 3/1969 | Kennedy et al. |
| 3,448,023 A | 6/1969 | Bell |
| 3,476,677 A | 11/1969 | Corley et al. |
| 3,607,707 A | 9/1971 | Chenevier |
| 3,873,512 A | 3/1975 | Latanision |
| 3,942,959 A | 3/1976 | Markoo et al. |
| 3,992,178 A | 11/1976 | Markoo et al. |
| 4,047,902 A | 9/1977 | Wiand |
| 4,082,638 A | 4/1978 | Jumer |
| 4,119,515 A | 10/1978 | Costakis |
| 4,125,444 A | 11/1978 | Inoue |
| 4,312,716 A | 1/1982 | Maschler et al. |
| 4,523,411 A | 6/1985 | Freerks |
| 4,704,511 A | 11/1987 | Miyano |
| 4,713,149 A | 12/1987 | Hoshino |
| 4,752,371 A | 6/1988 | Kreisel et al. |
| 4,772,361 A | 9/1988 | Dorsett et al. |
| 4,793,895 A | 12/1988 | Kaanta et al. |
| 4,839,993 A | 6/1989 | Masuko et al. |
| 4,934,102 A | 6/1990 | Leach et al. |
| 4,954,141 A | 9/1990 | Takiyama et al. |
| 4,956,056 A | 9/1990 | Zubatova et al. |
| 5,011,510 A | 4/1991 | Hayakawa et al. |
| 5,061,294 A | 10/1991 | Harmer et al. |
| 5,066,370 A | 11/1991 | Andreshak et al. |
| 5,096,550 A | 3/1992 | Mayer et al. |
| 5,108,463 A | 4/1992 | Buchanan |
| 5,136,817 A | 8/1992 | Tabata et al. |
| 5,137,542 A | 8/1992 | Buchanan et al. |
| 5,203,884 A | 4/1993 | Buchanan et al. |
| 5,217,586 A | 6/1993 | Datta et al. |
| 5,225,034 A | 7/1993 | Yu et al. |
| 5,257,478 A | 11/1993 | Hyde et al. |
| 5,328,716 A | 7/1994 | Buchanan |
| 5,478,435 A | 12/1995 | Murphy et al. |
| 5,534,106 A | 7/1996 | Cote et al. |
| 5,543,032 A | 8/1996 | Datta et al. |
| 5,560,753 A | 10/1996 | Schnabel et al. |
| 5,562,529 A | 10/1996 | Kishii et al. |
| 5,567,300 A | 10/1996 | Datta et al. |
| 5,575,706 A | 11/1996 | Tsai et al. |
| 5,578,362 A | 11/1996 | Reinhardt et al. |
| 5,624,300 A | 4/1997 | Kishii et al. |
| 5,633,068 A | 5/1997 | Ryoke et al. |
| 5,654,078 A | 8/1997 | Ferronato |
| 5,674,122 A | 10/1997 | Krech |
| 5,702,811 A | 12/1997 | Ho et al. |
| 5,738,574 A | 4/1998 | Tolles et al. |
| 5,804,507 A | 9/1998 | Perlov et al. |

| | | |
|---|---|---|
| 5,807,165 A | 9/1998 | Uzoh et al. |
| 5,823,854 A | 10/1998 | Chen |
| 5,840,190 A | 11/1998 | Scholander et al. |
| 5,840,629 A | 11/1998 | Carpio |
| 5,846,882 A | 12/1998 | Birang |
| 5,871,392 A | 2/1999 | Meikle et al. |
| 5,882,491 A | 3/1999 | Wardle |
| 5,893,796 A | 4/1999 | Birang et al. |
| 5,911,619 A | 6/1999 | Uzoh et al. |
| 5,938,801 A | 8/1999 | Robinson |
| 5,948,697 A | 9/1999 | Hata |
| 5,985,093 A | 11/1999 | Chen |
| 6,001,008 A | 12/1999 | Fujimori et al. |
| 6,004,880 A | 12/1999 | Liu et al. |
| 6,017,265 A | 1/2000 | Cook et al. |
| 6,020,264 A | 2/2000 | Lustig et al. |
| 6,024,630 A | 2/2000 | Shendon et al. |
| 6,033,293 A | 3/2000 | Crevasse et al. |
| 6,056,851 A | 5/2000 | Hsieh et al. |
| 6,066,030 A | 5/2000 | Uzoh |
| 6,074,284 A | 6/2000 | Tani et al. |
| 6,077,337 A | 6/2000 | Lee |
| 6,090,239 A | 7/2000 | Liu et al. |
| 6,103,096 A | 8/2000 | Datta et al. |
| 6,116,998 A | 9/2000 | Damgaard et al. |
| 6,132,292 A | 10/2000 | Kubo |
| 6,153,043 A | 11/2000 | Edelstein et al. |
| 6,156,124 A | 12/2000 | Tobin |
| 6,159,079 A | 12/2000 | Zuniga et al. |
| 6,171,467 B1 | 1/2001 | Weihs et al. |
| 6,176,992 B1 | 1/2001 | Talieh |
| 6,176,998 B1 | 1/2001 | Wardle et al. |
| 6,183,354 B1 | 2/2001 | Zuniga et al. |
| 6,190,494 B1 | 2/2001 | Dow |
| 6,210,257 B1 | 4/2001 | Carlson |
| 6,234,870 B1 | 5/2001 | Uzoh et al. |
| 6,238,271 B1 | 5/2001 | Cesna |
| 6,238,592 B1 | 5/2001 | Hardy et al. |
| 6,244,935 B1 | 6/2001 | Birang et al. |
| 6,248,222 B1 | 6/2001 | Wang |
| 6,251,235 B1 | 6/2001 | Talieh et al. |
| 6,257,953 B1 | 7/2001 | Gitis et al. |
| 6,258,223 B1 | 7/2001 | Cheung et al. |
| 6,261,157 B1 | 7/2001 | Bajaj et al. |
| 6,261,158 B1 | 7/2001 | Holland et al. |
| 6,261,168 B1 | 7/2001 | Jensen et al. |
| 6,261,959 B1 | 7/2001 | Travis et al. |
| 6,273,798 B1 | 8/2001 | Berman |
| 6,296,557 B1 | 10/2001 | Walker |
| 6,297,159 B1 | 10/2001 | Paton |
| 6,319,108 B1 | 11/2001 | Adefris et al. |
| 6,319,420 B1 | 11/2001 | Dow |
| 6,322,422 B1 | 11/2001 | Satou |
| 6,328,642 B1 | 12/2001 | Pant et al. |
| 6,328,872 B1 | 12/2001 | Talieh et al. |
| 6,331,135 B1 | 12/2001 | Sabde et al. |
| 6,368,184 B1 | 4/2002 | Beckage |
| 6,368,190 B1 | 4/2002 | Easter et al. |
| 6,372,001 B1 | 4/2002 | Omar et al. |
| 6,379,223 B1 | 4/2002 | Sun et al. |
| 6,381,169 B1 | 4/2002 | Bocian et al. |
| 6,383,066 B1 | 5/2002 | Chen et al. |
| 6,386,956 B1 | 5/2002 | Sato et al. |
| 6,391,166 B1 | 5/2002 | Wang |
| 6,395,152 B1 | 5/2002 | Wang |
| 6,402,591 B1 | 6/2002 | Thornton |
| 6,406,363 B1 | 6/2002 | Xu et al. |
| 6,409,904 B1 | 6/2002 | Uzoh et al. |
| 6,413,153 B1 | 7/2002 | Molar |
| 6,413,388 B1 | 7/2002 | Uzoh et al. |
| 6,428,394 B1 | 8/2002 | Mooring et al. |
| 6,431,968 B1 | 8/2002 | Chen et al. |
| 6,440,295 B1 | 8/2002 | Wang |
| 6,447,668 B1 | 9/2002 | Wang |
| 6,471,847 B2 | 10/2002 | Talieh et al. |
| 6,475,332 B1 | 11/2002 | Boyd et al. |
| 6,482,307 B2 * | 11/2002 | Ashjaee et al. ............... 205/103 |
| 6,497,800 B1 | 12/2002 | Talieh et al. |
| 6,517,426 B2 | 2/2003 | Lee |
| 6,520,843 B1 | 2/2003 | Halley |
| 6,537,140 B1 | 3/2003 | Miller et al. |
| 6,537,144 B1 | 3/2003 | Tsai et al. |
| 6,551,179 B1 | 4/2003 | Halley |
| 6,561,873 B2 | 5/2003 | Tsai et al. |
| 6,561,889 B1 | 5/2003 | Xu et al. |
| 6,569,004 B1 | 5/2003 | Pham |
| 6,572,463 B1 | 6/2003 | Xu et al. |
| 6,585,579 B2 | 7/2003 | Jensen et al. |
| 6,630,059 B1 | 10/2003 | Uzoh et al. |
| 6,641,471 B1 | 11/2003 | Pinheiro et al. |
| 6,656,019 B1 | 12/2003 | Chen et al. |
| 6,685,548 B2 | 2/2004 | Chen et al. |
| 6,692,338 B1 | 2/2004 | Kirchner |
| 6,739,951 B2 | 5/2004 | Sun et al. |
| 6,752,700 B2 | 6/2004 | Duescher |
| 6,769,969 B1 | 8/2004 | Duescher |
| 6,802,955 B2 | 10/2004 | Emesh et al. |
| 6,848,977 B1 | 2/2005 | Cook et al. |
| 6,856,761 B2 | 2/2005 | Doran |
| 6,962,524 B2 | 11/2005 | Butterfield et al. |
| 2001/0005667 A1 | 6/2001 | Tolles et al. |
| 2001/0024878 A1 | 9/2001 | Nakamura |
| 2001/0027018 A1 | 10/2001 | Molnar |
| 2001/0035354 A1 | 11/2001 | Ashjaee et al. |
| 2001/0036746 A1 | 11/2001 | Sato et al. |
| 2001/0040100 A1 | 11/2001 | Wang |
| 2001/0042690 A1 | 11/2001 | Talieh |
| 2002/0008036 A1 | 1/2002 | Wang |
| 2002/0011417 A1 | 1/2002 | Talieh et al. |
| 2002/0020621 A1 | 2/2002 | Uzoh et al. |
| 2002/0025760 A1 | 2/2002 | Lee et al. |
| 2002/0025763 A1 | 2/2002 | Lee et al. |
| 2002/0070126 A1 | 6/2002 | Sato et al. |
| 2002/0077037 A1 | 6/2002 | Tietz |
| 2002/0088715 A1 | 7/2002 | Talieh et al. |
| 2002/0102853 A1 | 8/2002 | Li et al. |
| 2002/0108861 A1 | 8/2002 | Emesh et al. |
| 2002/0119286 A1 | 8/2002 | Chen et al. |
| 2002/0123300 A1 | 9/2002 | Jones et al. |
| 2002/0127951 A1 | 9/2002 | Ishikawa et al. |
| 2002/0130049 A1 | 9/2002 | Chen et al. |
| 2002/0130634 A1 | 9/2002 | Ziemkowski et al. |
| 2002/0146963 A1 | 10/2002 | Teetzel |
| 2002/0148732 A1 | 10/2002 | Emesh et al. |
| 2003/0013397 A1 | 1/2003 | Rhoades |
| 2003/0034131 A1 | 2/2003 | Park et al. |
| 2003/0040188 A1 | 2/2003 | Hsu et al. |
| 2003/0114087 A1 | 6/2003 | Duboust et al. |
| 2003/0116445 A1 | 6/2003 | Sun et al. |
| 2003/0116446 A1 | 6/2003 | Duboust et al. |
| 2003/0209448 A1 | 11/2003 | Hu et al. |
| 2003/0213703 A1 | 11/2003 | Wang et al. |
| 2003/0220053 A1 | 11/2003 | Manens et al. |
| 2004/0020788 A1 | 2/2004 | Mavliev et al. |
| 2004/0020789 A1 | 2/2004 | Hu |
| 2004/0023495 A1 | 2/2004 | Butterfield et al. |
| 2004/0082288 A1 | 4/2004 | Tietz et al. |
| 2004/0121708 A1 | 6/2004 | Hu et al. |
| 2004/0134792 A1 | 7/2004 | Butterfield et al. |
| 2004/0163946 A1 | 8/2004 | Chang et al. |
| 2004/0266327 A1 | 12/2004 | Chen et al. |
| 2005/0000801 A1 | 1/2005 | Wang et al. |
| 2005/0092621 A1 | 5/2005 | Hu et al. |
| 2005/0133363 A1 | 6/2005 | Hu et al. |
| 2005/0161341 A1 | 7/2005 | Duboust et al. |
| 2005/0178666 A1 | 8/2005 | Tsai et al. |

| | | |
|---|---|---|
| 2005/0194681 A1 | 9/2005 | Hu et al. |

FOREIGN PATENT DOCUMENTS

| | | |
|---|---|---|
| EP | 0 455 455 | 11/1991 |
| EP | 1 361 023 | 11/2003 |
| JP | 58-171264 | 10/1983 |
| JP | 61-079666 | 4/1986 |
| JP | 61-265279 | 11/1986 |
| JP | 63-028512 | 2/1988 |
| JP | 05-277957 | 10/1993 |
| JP | 10-006213 | 1/1998 |
| JP | 10-270412 | 10/1998 |
| JP | 11-042554 | 2/1999 |
| JP | 11-239961 | 7/1999 |
| JP | 11-285962 | 10/1999 |
| JP | 2000-218513 | 8/2000 |
| JP | 2001-77117 | 3/2001 |
| JP | 2001-179611 | 7/2001 |
| JP | 2001-244223 | 9/2001 |
| JP | 2001-284300 | 10/2001 |
| JP | 2002-093758 | 3/2002 |
| JP | 3453352 | 3/2002 |
| JP | 2002-334858 | 11/2002 |
| KR | 2003-037158 | 5/2003 |
| SU | 1618538 | 1/1991 |
| TW | 434110 | 5/2001 |
| TW | 446601 | 7/2001 |
| TW | 578641 | 3/2004 |
| TW | 592164 | 6/2004 |
| WO | WO 93/15879 | 8/1993 |
| WO | WO 98/49723 | 11/1998 |
| WO | WO 99/41434 | 8/1999 |
| WO | WO 99/53119 | 10/1999 |
| WO | WO 99/65072 | 12/1999 |
| WO | WO 00/03426 | 1/2000 |
| WO | WO 00/26443 | 5/2000 |
| WO | WO 00/33356 | 6/2000 |
| WO | WO 00/59682 | 10/2000 |
| WO | WO 01/13416 | 2/2001 |
| WO | WO 01/49452 | 7/2001 |
| WO | WO 01/52307 | 7/2001 |
| WO | WO 01/63018 | 8/2001 |
| WO | WO 01/71066 | 9/2001 |
| WO | WO 01/88229 | 11/2001 |
| WO | WO 01/88954 | 11/2001 |
| WO | WO 02/23616 | 3/2002 |
| WO | WO 02/064314 | 8/2002 |
| WO | WO 02/075804 | 9/2002 |
| WO | WO 03/001581 | 1/2003 |
| WO | WO 03/099519 A1 | 12/2003 |
| WO | WO 2004/073926 A1 | 9/2004 |

OTHER PUBLICATIONS

Contolini, "Electrochemical Planarization of ULSI Copper," Solid State Technology, vol. 40, No. 6, Jun. 1, 1997.

Nogami, "An Innovation to Integrate Porous Low-K Materials and Copper," InterConnect Japan 2001; Honeywell Seminar Dec. 6, 2001, p. 1-12.

Partial International Search / PCT Invitation to pay additional fees dated Nov. 14, 2002.

Notification regarding review of justification for invitation to pay additional fees for PCT/US/02/11009 dated Feb. 25, 2003.

International Search Report for PCT/US 02/11009 dated Feb. 25, 2003.

PCT Written Opinion dated Apr. 1, 2003 for PCT/US02/11009.

Notification of Transmittal of International Preliminary Examination Report dated Nov. 10, 2003.

European Search Report for 03252801.0, dated Jan. 16, 2004.

Communication pursuant to Article 96(2) EPC for Application No. 02728965.4, dated Jun. 11, 2004.

Search Report issued by the Austrian Patent Office for corresponding Singapore Patent Application No. 200302562-4, provided by letter dated Oct. 7, 2004.

Invitation to pay additional fees dated Nov. 11, 2004.

Notification of Transmittal of International Search Report and Written Opinion dated Feb. 21, 2005.

Notification of transmittal of the International Search report and Written Opinion dated Mar. 14, 2005.

PCT International Search Report and Written Opinion dated Apr. 28, 2005 for PCT/USO4/037870.

EP Search Report for Application No. 03254807.5 dated Sep. 27, 2005.

European Examination Report dated Sep. 9, 2007 for European Application No. 05077958.6.

PCT International Search Report and Written Opinion for PCT/US2006/004114, dated Jul. 14, 2006.

Korean Office Action dated Mar. 26, 2008 for Korean Application No. 10-2007-7023166.

First Office Action issued Feb. 20, 2009 in Chinese Patent Application No. 200480019124.9.

Taiwan Office Action dated Dec. 25, 2007 for Taiwan Application No. 092121222.

Japanese Office Action, Patent Application No. P2003-205790, dated Jan. 27, 2009.

First Office Action dated Nov. 7, 2008 for Chinese Patent Application No. 200480022037.9.

Taiwan Office Action issued Oct. 27, 2008, in Taiwan Patent Application No. 93136038.

Korean Office Action, Korean Patent Application No. 10-2007-7023166, dated Dec. 19, 2008.

* cited by examiner

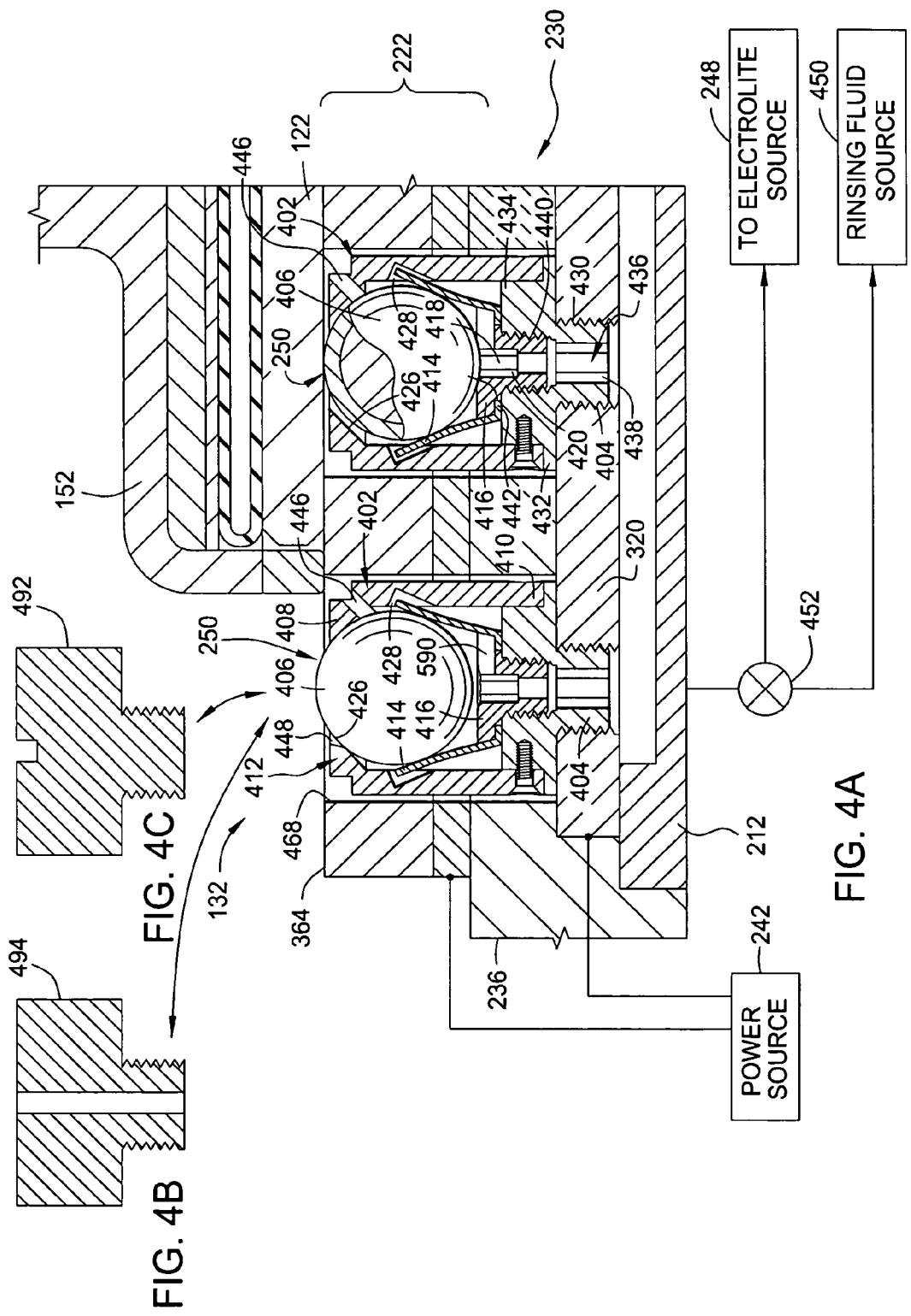

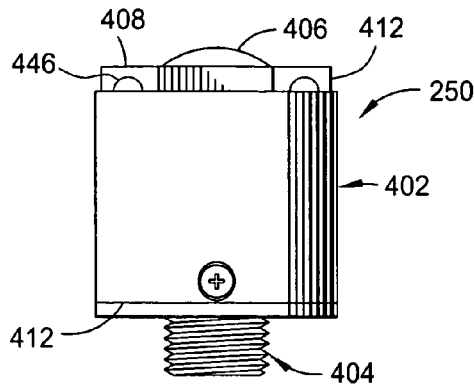
FIG. 5A
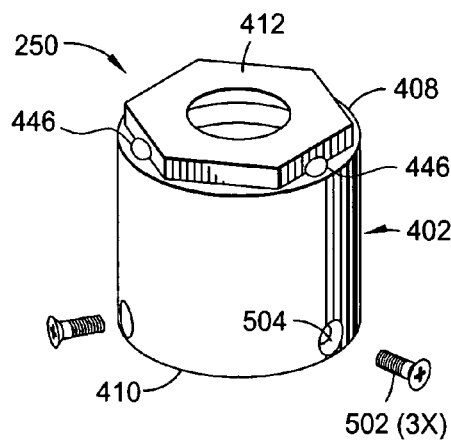
FIG. 5B
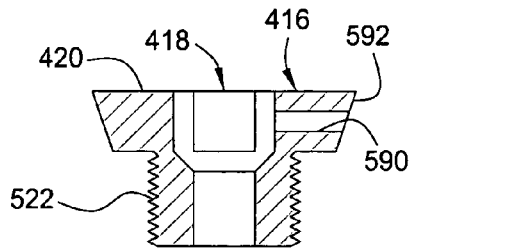
FIG. 6
FIG. 5C
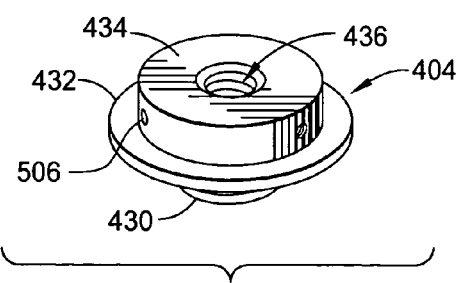
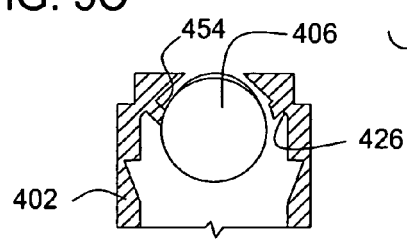
FIG. 5D

CONTACT ASSEMBLY AND METHOD FOR ELECTROCHEMICAL MECHANICAL PROCESSING

CROSS-REFERENCE TO RELATED APPLICATIONS

This application claims the benefit of co-pending U.S. Provisional Patent Application Ser. No. 60/610,930, filed on Sep. 18, 2004, which is incorporated by reference in its entirety.

This application is also a continuation-in-part (CIP) of co-pending U.S. patent application Ser. No. 10/880,752, filed on Jun. 30, 2004, which claims benefit of U.S. Provisional Patent Application Ser. No. 60/484,189, filed Jul. 1, 2003, and U.S. Provisional Patent Application Ser. No. 60/516,680, filed Nov. 3, 2003, and is additionally a continuation-in-part of U.S. patent application Ser. No. 10/608,513, filed Jun. 26, 2003 (hereinafter referred to as the "'513 application" now U.S. Pat. No. 7,374,644), which is a continuation-in-part of U.S. patent application Ser. No. 10/140,010, filed May 7, 2002 now U.S. Pat. No. 6,979,248. The '513 application is also a continuation-in-part of U.S. patent application Ser. No. 10/211,626, filed Aug. 2, 2002, now U.S. Pat. No. 7,125,477 which is a continuation-in-part of U.S. patent application Ser. No. 10/033,732, filed Dec. 27, 2001, now U.S. Pat. No. 7,066,800 which is a continuation-in-part of U.S. patent application Ser. No. 09/505,899, filed Feb. 17, 2000 now U.S. Pat. No. 6,537,144. The '513 application is additionally a continuation-in-part of U.S. patent application Ser. No. 10/210,972, filed Aug. 2, 2002, now U.S. Pat. No. 7,303,662 which is also a continuation-in-part of U.S. patent application Ser. No. 09/505,899, filed Feb. 17, 2000 now U.S. Pat. No. 6,537,144. The '513 application is further continuation-in-part of U.S. patent application Ser. No. 10/151,538, filed May 16, 2002 now abandoned. This application is also a continuation-in-part of U.S. patent application Ser. No. 10/244,697, filed Sep. 16, 2002, now U.S. Pat. No. 6,991,526 which is a continuation-in-part of U.S. application Ser. No. 10/244,688, filed Sep. 16, 2002, now U.S. Pat. No. 6,848,970 and of U.S. patent application Ser. No. 10/391,324, filed Mar. 18, 2003. All of the above referenced applications are hereby incorporated by reference in their entireties.

BACKGROUND OF THE INVENTION

1. Field of the Invention

Embodiments of the present invention generally relate to a method and apparatus for electrochemical mechanical processing, and more specifically, to a contact assembly and method for applying a bias to a workpiece, such as a substrate and the like, during an electrochemical mechanical process.

2. Description of the Related Art

Electrochemical mechanical planarizing (ECMP) is a technique used to remove conductive materials from a substrate surface by electrochemical dissolution while concurrently polishing the substrate with reduced mechanical abrasion compared to conventional planarization processes. ECMP systems may generally be adapted for deposition of conductive material on the substrate by reversing the polarity of the bias. Electrochemical dissolution is performed by applying a bias between a cathode and a substrate surface to remove conductive material from the substrate surface into a surrounding electrolyte. Typically, the bias is applied to the substrate surface by a conductive surface part of or passing through a polishing material on which the substrate is processed. A mechanical component of the polishing process is performed by providing relative motion between the substrate and the polishing material that enhances the removal of the conductive material from the substrate.

During ECMP processing, the conductive material is electrical biased by one or more contact elements. The contact elements are subject to corrosion and/or attack by processing chemistries, thereby resulting in diminished electrical conduction to substrates over a period of processing cycles. As the efficiency of the electrical contact is diminished, processing of a substrate is impaired. Moreover, sludge and/or other deposits may accumulate around the electrical contact, further obstructing the maintenance of good electrical biasing of the substrate through the contact element. Good electrical connections for biasing the substrate must be preserved in order to maintain robust process performance.

Thus, there is a need for an improved method and apparatus electrochemical processing.

SUMMARY OF THE INVENTION

Embodiments of the invention generally provide a method and apparatus for processing a substrate in an electrochemical mechanical planarizing system. In one embodiment, a contact assembly for electrochemically processing a substrate includes a housing having a ball disposed in a passage formed through the housing. The ball is adapted to extend partially from the housing to contact a substrate during processing. The housing includes a fluid inlet that is positioned to cause fluid, entering the housing through the inlet, to sweep the entire passage to ensure contaminants and other debris do not accumulate and degrade the electrical performance of the contact assembly. In another embodiment, a method for electrochemically processing includes flowing a processing fluid through a passage which retains a conductive element. The flow sweeps the entire passage of the housing. A first electrical bias is applied to the conductive element in contact with the substrate relative an electrode electrically coupled to the substrate by the processing fluid. After the substrate is separated from the conductive element, flow of processing fluid is continued through the passage past the conductive element.

BRIEF DESCRIPTION OF THE DRAWINGS

So that the manner in which the above recited embodiments of the invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

FIG. 4A is a partial sectional view of the bulk ECMP station through two contact assemblies;

FIGS. 4B-C are sectional views of plugs;

FIGS. 5A-C are side, exploded and sectional views of one embodiment of a contact assembly;

FIG. 5D is a sectional view of alternative embodiment of the housing of FIGS. 5A-C;

FIG. 6 is one embodiment of a contact element;

To facilitate understanding, identical reference numerals have been used, where possible, to designate identical elements that are common to the figures. It is contemplated that embodiments present in one embodiment may be beneficially incorporated in other embodiments with out further recitation.

DETAILED DESCRIPTION

Embodiments for a system and method for removal of conductive material from a substrate are provided. Although the embodiments disclosed below focus primarily on removing material from, e.g., planarizing, a substrate, it is contemplated that the teachings disclosed herein may be used to deposit material on a substrate by reversing the polarity of an electrical bias applied between the substrate and an electrode of the system.

Figure 1:
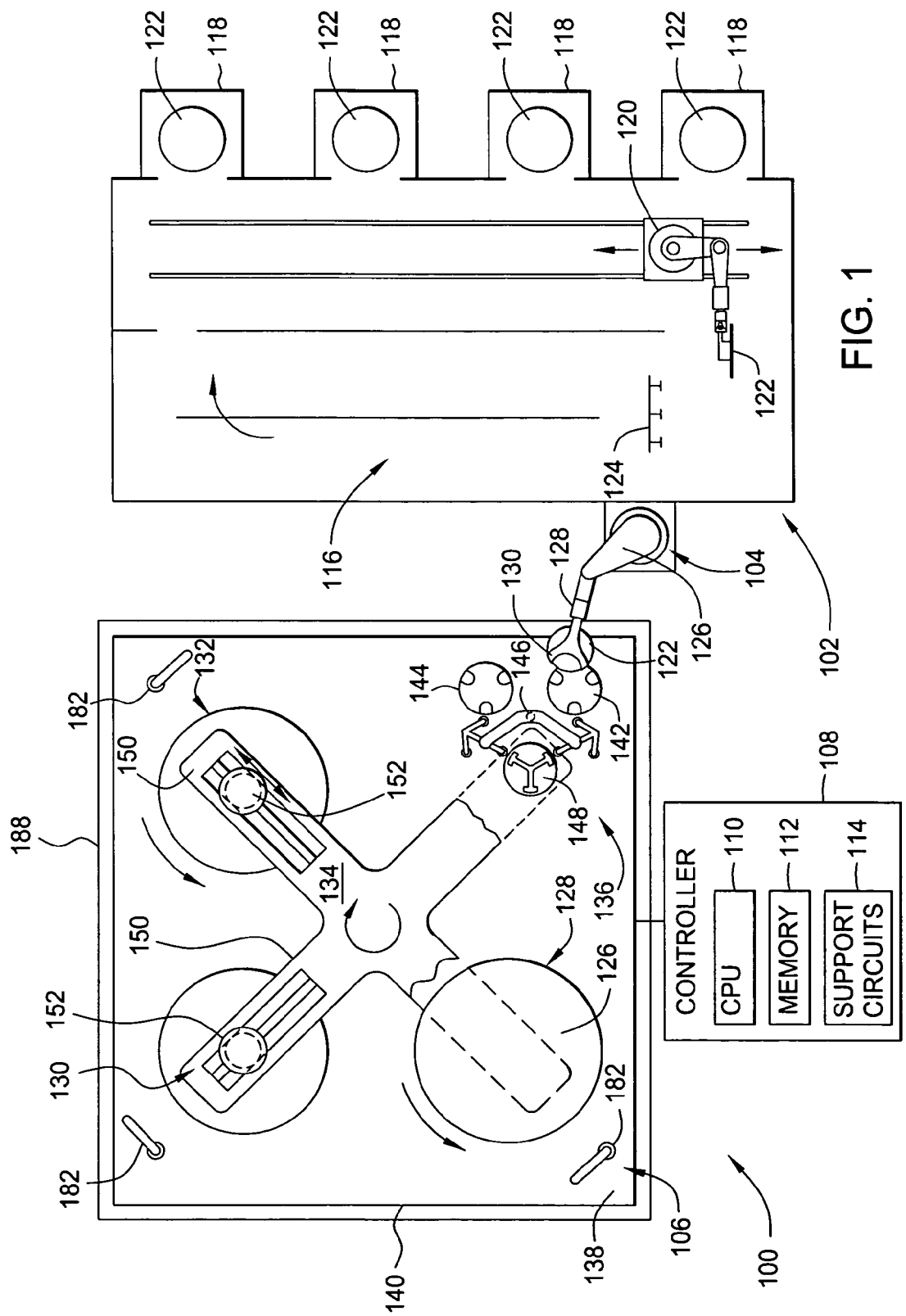
FIG. 1 is a plan view of an electrochemical mechanical processing system.

FIG. 1 is a plan view of one embodiment of a planarization system 100 having an apparatus for electrochemically processing a substrate. The exemplary system 100 generally comprises a factory interface 102, a loading robot 104, and a planarizing module 106. The loading robot 104 is disposed proximate the factory interface 102 and the planarizing module 106 to facilitate the transfer of substrates 122 therebetween.

A controller 108 is provided to facilitate control and integration of the modules of the system 100. The controller 108 comprises a central processing unit (CPU) 110, a memory 112, and support circuits 114. The controller 108 is coupled to the various components of the system 100 to facilitate control of, for example, the planarizing, cleaning, and transfer processes.

The factory interface 102 generally includes a cleaning module 116 and one or more wafer cassettes 118. An interface robot 120 is employed to transfer substrates 122 between the wafer cassettes 118, the cleaning module 116 and an input module 124. The input module 124 is positioned to facilitate transfer of substrates 122 between the planarizing module 106 and the factory interface 102 by grippers, for example vacuum grippers or mechanical clamps.

The planarizing module 106 includes at least a first electrochemical mechanical planarizing (ECMP) station 128, and optionally, at least one conventional chemical mechanical planarizing (CMP) stations 132 disposed in an environmentally controlled enclosure 188. Examples of planarizing modules 106 that can be adapted to benefit from the invention include MIRRA®, MIRRA MESA™, REFLEXION®, REFLEXION® LK, and REFLEXION LK Ecmp™ Chemical Mechanical Planarizing Systems, all available from Applied Materials, Inc. of Santa Clara, Calif. Other planarizing modules, including those that use processing pads, planarizing webs, or a combination thereof, and those that move a substrate relative to a planarizing surface in a rotational, linear or other planar motion may also be adapted to benefit from the invention.

In the embodiment depicted in FIG. 1, the planarizing module 106 includes the first ECMP station 128, a second ECMP station 130 and one CMP station 132. Bulk removal of conductive material from the substrate is performed through an electrochemical dissolution process at the first ECMP station 128. After the bulk material removal at the first ECMP station 128, residual conductive material is removed from the substrate at the second ECMP station 130 through a second electrochemical mechanical process. It is contemplated that more than one residual ECMP stations 130 may be utilized in the planarizing module 106.

A conventional chemical mechanical planarizing process is performed at the planarizing station 132 after processing at the second ECMP station 130. An example of a conventional CMP process for the removal of copper is described in U.S. Pat. No. 6,451,697, issued Sep. 17, 2002, which is incorporated by reference in its entirety. An example of a conventional CMP process for the barrier removal is described in U.S. patent application Ser. No. 10/187,857, filed Jun. 27, 2002, which is incorporated by reference in its entirety. It is contemplated that other CMP processes may be alternatively performed. As the CMP stations 132 are conventional in nature, further description thereof has been omitted for the sake of brevity.

The exemplary planarizing module 106 also includes a transfer station 136 and a carousel 134 that are disposed on an upper or first side 138 of a machine base 140. In one embodiment, the transfer station 136 includes an input buffer station 142, an output buffer station 144, a transfer robot 146, and a load cup assembly 148. The input buffer station 142 receives substrates from the factory interface 102 by the loading robot 104. The loading robot 104 is also utilized to return polished substrates from the output buffer station 144 to the factory interface 102. The transfer robot 146 is utilized to move substrates between the buffer stations 142, 144 and the load cup assembly 148.

In one embodiment, the transfer robot 146 includes two gripper assemblies, each having pneumatic gripper fingers that hold the substrate by the substrate's edge. The transfer robot 146 may simultaneously transfer a substrate to be processed from the input buffer station 142 to the load cup assembly 148 while transferring a processed substrate from the load cup assembly 148 to the output buffer station 144. An example of a transfer station that may be used to advantage is described in U.S. patent application Ser. No. 6,156,124, issued Dec. 5, 2000 to Tobin, which is herein incorporated by reference in its entirety.

The carousel 134 is centrally disposed on the base 140. The carousel 134 typically includes a plurality of arms 150, each supporting a planarizing head assembly 152. Two of the arms 150 depicted in FIG. 1 are shown in phantom such that a planarizing surface 126 of the first ECMP station 128 and the transfer station 136 may be seen. The carousel 134 is indexable such that the planarizing head assemblies 152 may be moved between the planarizing stations 128, 132 and the transfer station 136. One carousel that may be utilized to advantage is described in U.S. Pat. No. 5,804,507, issued Sep. 8, 1998 to Perlov, et al., which is hereby incorporated by reference in its entirety.

A conditioning device 182 is disposed on the base 140 adjacent each of the planarizing stations 128, 132. The conditioning device 182 periodically conditions the planarizing material disposed in the stations 128, 132 to maintain uniform planarizing results.

Figure 2:
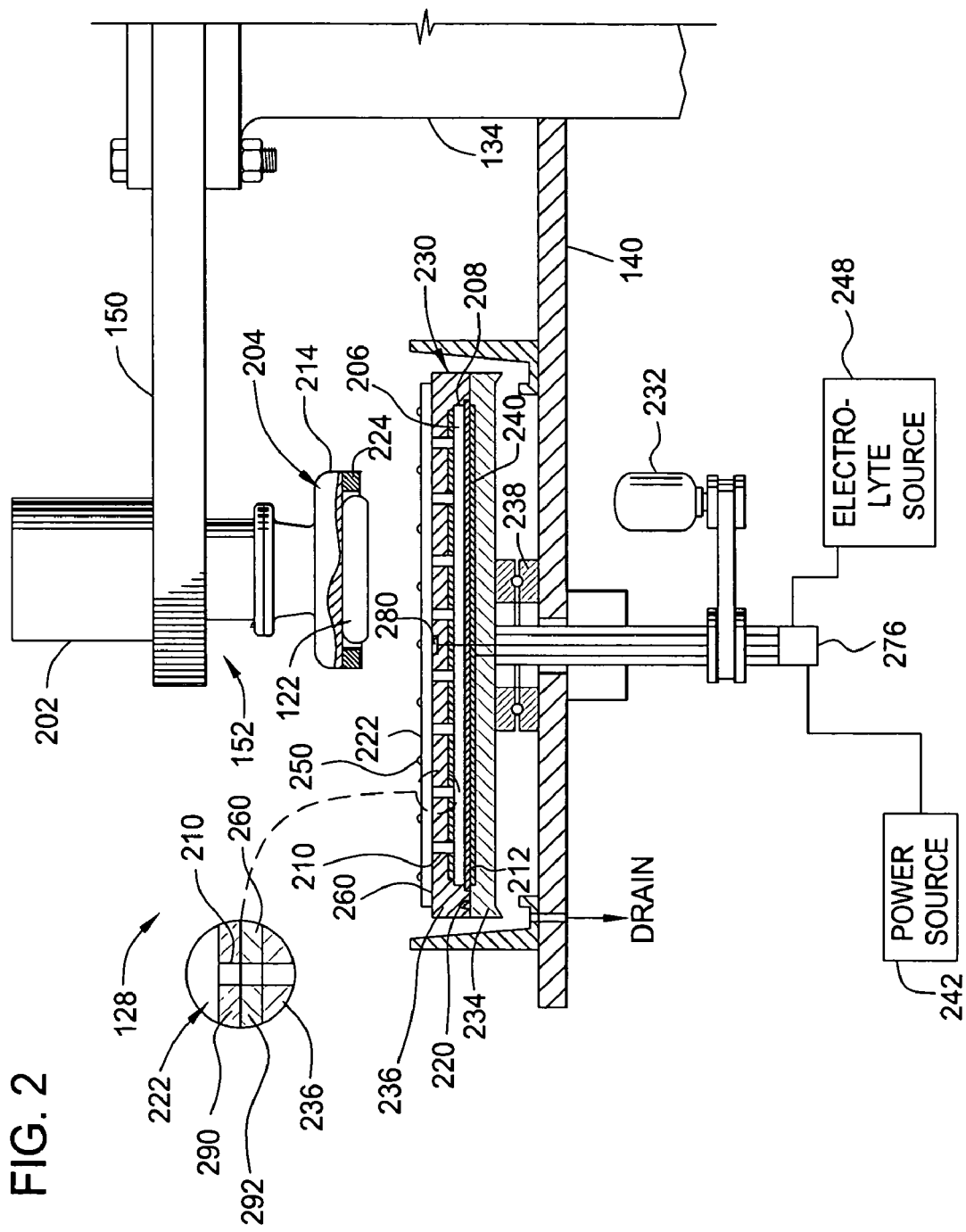
FIG. 2 is a sectional view of one embodiment of a bulk electrochemical mechanical processing (ECMP) station of the system of FIG. 1.

FIG. 2 depicts a sectional view of one of the planarizing head assemblies 152 positioned over one embodiment of the first ECMP station 128. The planarizing head assembly 152 generally comprises a drive system 202 coupled to a planarizing head 204. The drive system 202 generally provides at least rotational motion to the planarizing head 204. The planarizing head 204 additionally may be actuated toward the first ECMP station 128 such that the substrate 122 retained in the planarizing head 204 may be disposed against the planarizing surface 126 of the first ECMP station 128 during processing. The drive system 202 is coupled to the controller 108 that provides a signal to the drive system 202 for controlling the rotational speed and direction of the planarizing head 204.

In one embodiment, the planarizing head may be a TITAN HEAD™ or TITAN PROFILER™ wafer carrier manufactured by Applied Materials, Inc. Generally, the planarizing head 204 comprises a housing 214 and retaining ring 224 that defines a center recess in which the substrate 122 is retained. The retaining ring 224 circumscribes the substrate 122 disposed within the planarizing head 204 to prevent the substrate from slipping out from under the planarizing head 204 while processing. The retaining ring 224 can be made of plastic materials such as PPS, PEEK, and the like, or conductive materials such as stainless steel, Cu, Au, Pd, and the like, or some combination thereof. It is further contemplated that a conductive retaining ring 224 may be electrically biased to control the electric field during ECMP. It is contemplated that other planarizing heads may be utilized.

The first ECMP station 128 generally includes a platen assembly 230 that is rotationally disposed on the base 140. The platen assembly 230 is supported above the base 140 by a bearing 238 so that the platen assembly 230 may be rotated relative to the base 140. An area of the base 140 circumscribed by the bearing 238 is open and provides a conduit for the electrical, mechanical, pneumatic, control signals and connections communicating with the platen assembly 230.

Conventional bearings, rotary unions and slip rings, collectively referred to as rotary coupler 276, are provided such that electrical, mechanical, fluid, pneumatic, control signals and connections may be coupled between the base 140 and the rotating platen assembly 230. The platen assembly 230 is typically coupled to a motor 232 that provides the rotational motion to the platen assembly 230. The motor 232 is coupled to the controller 108 that provides a signal for controlling for the rotational speed and direction of the platen assembly 230.

The platen assembly 230 has an upper plate 236 and a lower plate 234. The upper plate 236 may be fabricated from a rigid material, such as a metal or rigid plastic, and in one embodiment, is fabricated from or coated with a dielectric material, such as CPVC. The upper plate 236 may have a circular, rectangular or other plane form. A top surface 260 of the upper plate 236 supports a processing pad assembly 222 thereon. The processing pad assembly may be retained to the upper plate 236 by magnetic attraction, vacuum, clamps, adhesives and the like.

The lower plate 234 is generally fabricated from a rigid material, such as aluminum. In the embodiment depicted in FIG. 2, the upper and lower plates 236, 234 are coupled by a plurality of fasteners 228. Generally, a plurality of locating pins 220 (one is shown in FIG. 2) are disposed between the upper and lower plates 236, 234 to ensure alignment therebetween. The upper plate 236 and the lower plate 234 may optionally be fabricated from a single, unitary member.

A plenum 206 is defined in the platen assembly 230. The plenum 206 may be partially formed in at least one of the upper or lower plates 236, 234. In the embodiment depicted in FIG. 2, the plenum 206 is defined in a recess 208 partially formed in the lower surface 262 of the upper plate 236. A plurality of holes 210 are formed in the upper plate 236 to allow electrolyte, provided to the plenum 206 from an electrolyte source 248, to flow uniformly though the platen assembly 230 and into contact with the substrate 122 during processing. The plenum 206 is partially bounded by a cover 212 coupled to the upper plate 236 enclosing the recess 208.

Figure 3:
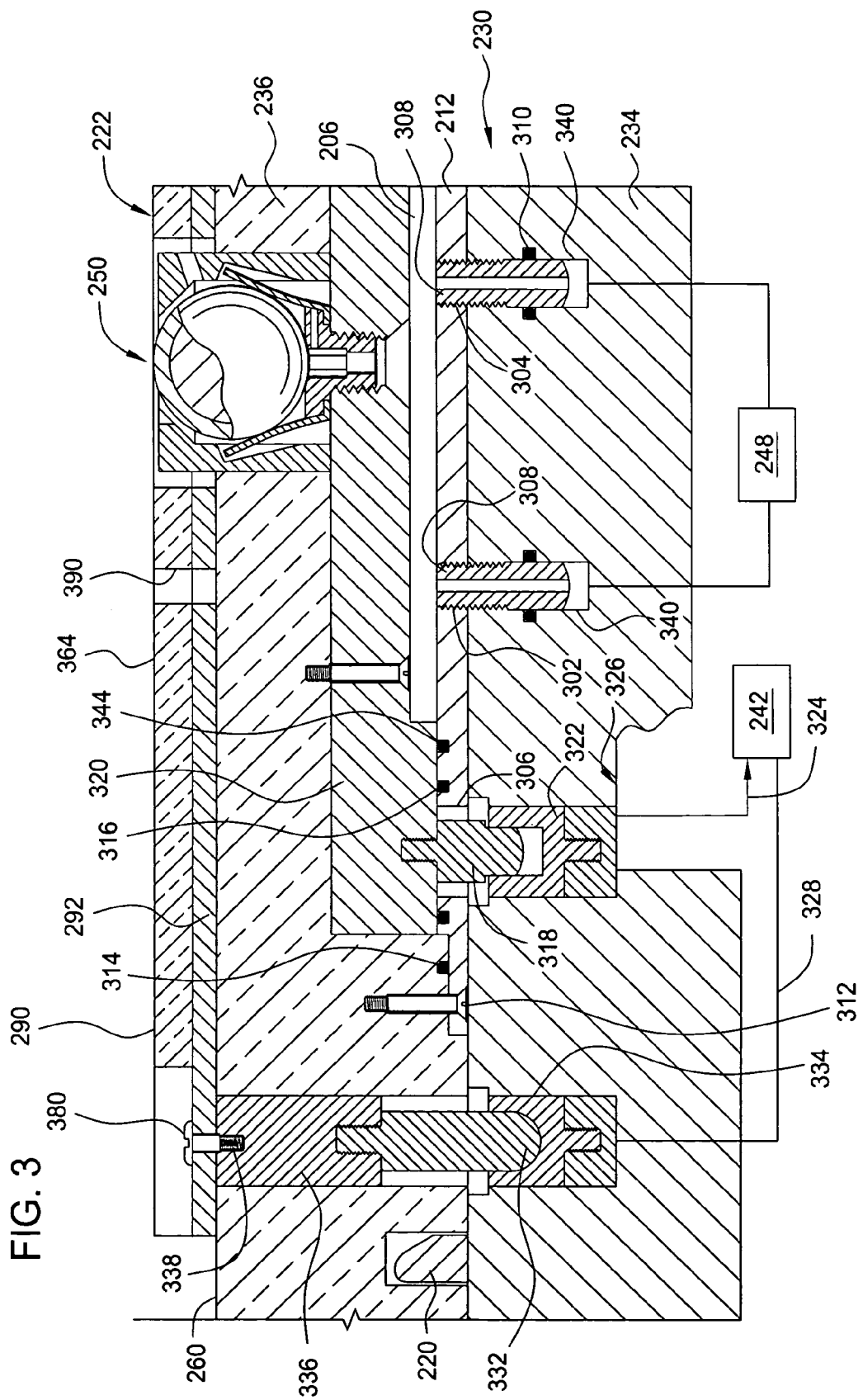
FIG. 3 is a partial sectional view of one embodiment of a platen assembly of the bulk ECMP station of FIG. 2.

FIG. 3 is a partial sectional view of the platen assembly 230 showing one embodiment of the cover 212 in greater detail.

The cover 212 is sealingly coupled to the upper plate 236 by a plurality of fasteners 312. A plenum seal 314 is disposed between the cover 212 and upper plate 236.

The cover 212 includes a first aperture 302, a second aperture 304 and a third aperture 306. The first and second apertures 302, 304 provide an inlet and outlet that couple the plenum 206 through the cover 212 to the electrolyte source 248. In one embodiment, the first and second apertures 302, 304 engage male fittings 308 that mate with holes 340 formed in the lower plate 234. A radial seal 310, for example, an o-ring or lobed seal, is disposed between the fittings 308 and bore of the holes 340 to provide a fluid seal that prevents electrolyte from leaking out of the plenum 206 through the cover 212.

The third aperture 306 is circumscribed by a seal 316 that isolates the third aperture 306 from electrolyte disposed within the plenum 206. In one embodiment, the seal 316 is positioned outward of second plenum seal 344 to provide an additional barrier between the first bayonet fitting 318 and the electrolyte disposed in the plenum 206.

A first bayonet fitting 318 is disposed through the third aperture 306 and couples a contact plate 320, disposed in the plenum 206 and coupled to the upper plate 236, to a socket 322 disposed in the lower plate 234. The socket 322 is coupled by a first power line 324 disposed in a passage 326 formed in the lower plate 234 to the power source 242 through the rotary coupler 276 (as shown in FIG. 2).

A second line 328 is disposed through the lower plate 234 coupling a socket 334 disposed proximate the perimeter of the lower plate 234 to the power source 242. A second bayonet fitting 332 is coupled to a contact member 336 disposed in the upper plate 236. The contact member 336 includes a threaded hole 338 or other element exposed to the top surface 260 of the upper plate 236 that is suitable for electrically coupling the contact member 336 to the processing pad assembly 222. In the embodiment depicted in FIG. 3, the processing pad assembly 222 is coupled by the second bayonet fitting 332 to the power source 242.

The bayonet fittings 318, 332 and locating pins 220 facilitate alignment of the plates 234, 236 while fluid and electrical connection are made as the upper plate 236 is disposed on the lower plate 234. This advantageously provides both ease of assembly with robust electrical and fluid coupling between the plates 234, 236.

Referring additionally to FIG. 2, the processing pad assembly 222 includes an electrode 292 and at least a planarizing portion 290. At least one contact assembly 250 extends above the processing pad assembly 222 and is adapted to electrically couple the substrate being processing on the processing pad assembly 222 to the power source 242.

The electrode 292 is also coupled to the power source 242 so that an electrical potential may be established between the substrate and electrode 292. In one embodiment the electrode 292 is electrically coupled to the power source 242 by a fastener 380 disposed through the electrode 292 and engaging the threaded hole 338 of the contact member 336 (as shown in FIG. 3).

The electrode 292 is typically comprised of a conductive material, such as stainless steel, copper, aluminum, gold, silver and tungsten, among others. The electrode 292 may be solid, impermeable to electrolyte, permeable to electrolyte or perforated. In the embodiment depicted in FIG. 3, the electrode 292 is configured to allow electrolyte therethrough. The electrode 292 may be permeable, have holes formed therethrough or a combination thereof. The electrode 292 is disposed on the top surface 260 of the platen assembly 230 and is coupled to the power source 242 through the platen assembly 230.

Embodiments of the processing pad assembly 222 suitable for bulk removal of material from the substrate 122 may generally include a planarizing surface that is substantially dielectric. As the conductive material to be removed from the substrate 122 substantially covers the substrate 122, fewer contacts for biasing the substrate 122 are required. Embodiments of the processing pad assembly 222 suitable for residual removal of material from the substrate 122 may generally include a planarizing surface that is substantially conductive. As the conductive material to be removed from the substrate 122 comprises isolated islands of material disposed on the substrate 122, more contacts for biasing the substrate 122 are required.

In one embodiment, the planarizing layer 290 of the processing pad assembly 222 may include a planarizing surface 364 that is dielectric, such as a polyurethane pad. Apertures 390 are formed through the planarizing surface 364 to expose the electrode 292 such that electrolyte may create a conductive path (or cell) between the substrate and electrode. Examples of processing pad assemblies that may be adapted to benefit from the invention are described in U.S. patent application Ser. No. 10/455,941, filed Jun. 6, 2003 by Y. Hu et al. (entitled "CONDUCTIVE PLANARIZING ARTICLE FOR ELECTROCHEMICAL MECHANICAL PLANARIZING") and U.S. patent application Ser. No. 10/455,895, filed Jun. 6, 2003 by Y. Hu et al. (entitled "CONDUCTIVE PLANARIZING ARTICLE FOR ELECTROCHEMICAL MECHANICAL PLANARIZING"), both of with are hereby incorporated by reference in their entireties.

FIG. 4A is a partial sectional view of the first ECMP station 128 through two contact assemblies 250, and FIGS. 5A-C are side, exploded and sectional views of one of the contact assemblies 250 shown in FIG. 4A. The platen assembly 230 includes at least one contact assembly 250 projecting therefrom and coupled to the power source 242 that is adapted to bias a surface of the substrate 122 during processing. The contact assemblies 250 may be coupled to the platen assembly 230, part of the processing pad assembly 222, or a separate element. Although two contact assemblies 250 are shown in FIG. 4A, any number of contact assemblies may be utilized and may be distributed in any number of configurations relative to the centerline of the upper plate 236.

The contact assemblies 250 are generally electrically coupled to the contact plate 320 through the upper plate 236 and extend at least partially through respective apertures 468 formed in the processing pad assembly 222. The position of the contact assemblies 250 may be chosen to have a predetermined configuration across the platen assembly 230. For predefined processes, individual contact assemblies 250 may be repositioned in different apertures 468, while apertures not containing contact assemblies may be plugged with a stopper 492 or filled with a nozzle 494 that allows flow of electrolyte from the plenum 206 to the substrate as shown in FIGS. 4B-C. One contact assembly that may be adapted to benefit from the invention is described in U.S. patent application Ser. No. 10/445,239, filed May 23, 2003, by Butterfield, et al., and is hereby incorporated by reference in its entirety.

Although the embodiments of the contact assembly 250 described below with respect to FIG. 4A depicts a rolling ball contact, the contact assembly 250 may alternatively comprise a structure or assembly having a conductive upper layer or surface suitable for electrically biasing the substrate 122. For example, the contact assembly 250 may include a structure having an upper layer made from a conductive material or a conductive composite (i.e., the conductive elements are dispersed integrally with or comprise the material comprising the upper surface), such as a polymer matrix having conductive particles dispersed therein or a conductive coated fabric, among others. Other examples of suitable contact assemblies are described in U.S. Provisional Patent Application Ser. No. 60/516,680, filed Nov. 3, 2003, by Hu, et al., which is hereby incorporated by reference in its entirety.

In one embodiment, each of the contact assemblies 250 includes a hollow housing 402, an adapter 404, a ball 406, a contact element 414 and a clamp bushing 416. The ball 406 has a conductive outer surface and is movably disposed in the housing 402. The ball 406 may be disposed in a first position having at least a portion of the ball 406 extending above the planarizing surface 364 and at least a second position where the ball 406 is flush with the planarizing surface 364. The ball 406 is generally suitable for electrically coupling the substrate 122 to the power source 242 through the contact plate 320.

The power source 242 generally provides a positive electrical bias to the ball 406 during processing. Between planarizing substrates, the power source 242 may optionally apply a negative bias to the ball 406 to minimize attack on the ball 406 by process chemistries.

The housing 402 is configured to provide a flow of electrolyte from the source 248 to the substrate during processing. The housing 402 is fabricated from a dielectric material compatible with process chemistries. In one embodiment, the housing 402 is made of PEEK. The housing 402 has a first end 408 and a second end 410. A drive feature 412 is formed in and/or on the first end 408 to facilitate installation of the contact assembly 250 to the contact plate 320. The drive feature 412 may be holes for a spanner wrench, a slot or slots, a recessed drive feature (such as for a TORX® or hex drive, and the like) or a projecting drive feature (such as wrench flats or a hex head, and the like), among others. The first end 408 additionally includes a seat 426 that prevents the ball 406 from passing out of the first end 408 of the housing 402. The seat 426 optionally may include one or more grooves 448 formed therein that allow fluid flow to exit the housing 402 between the ball 406 and seat 426. Maintaining fluid past the ball 406 may minimize the propensity of process chemistries to attack the ball 406.

In one embodiment, a plurality of grooves 448 is formed around the seat 426 in a spaced apart relation. The spaced apart relation of the grooves 448 provides a more uniform electrolyte lead flow distribution around the ball 406, thereby enhancing corrosion protection of the ball. Moreover, the bleed flow allows the force applied to the balls to be the same with or without the substrate presence, compared to conventional housings without bleed flows where the ball force is dramatically different in the up and down position. In the embodiment depicted in FIG. 5B, six grooves 448 are shown spaced equidistant around the seat 428.

Alternatively as shown in FIG. 5D, the grooves 448 may be replaced or augmented by one or more spacers 454 extending from the seat 426 (or housing 402). The spacers 454 prevent the ball 406 from contacting the seat 426 in a manner that prevents fluid from bleeding past the ball 406 when the ball 406 is urged against (or towards) the seat 426.

In another embodiment, one or more relief holes 446 may be formed through the housing 402 to allow fluid to exit the housing 402 while the ball 406 is disposed against the seat 426. The relief holes 446 prevent fluid from residing in the housing 402 for extended periods, thereby minimizing accumulation of sludge or other contaminants that may stick to the ball 406 and degrade electrical conductance, obstruct flow through the housing 406 while processing, cause ball stiction or otherwise degrade processing performance.

The contact element 414 is coupled between the clamp bushing 416 and adapter 404. The contact element 414 is generally configured to electrically connect the adapter 404 and ball 406 substantially or completely through the range of ball positions within the housing 402. In one embodiment, the contact element 414 may be configured as a spring form.

In the embodiment depicted in FIGS. 4 and 5A-C and detailed in FIG. 6, the contact element 414 includes an annular base 442 having a plurality of flexures 444 extending therefrom in a polar array. The flexure 444 includes two support elements 602 extending from the base 442 to a distal end 608. The support elements 602 are coupled by a plurality of rungs 604 to define apertures 610 that facilitate flow past the contact element 416 with little pressure drop as discussed further below. A contact pad 606 adapted to contact the ball 406 couples the support elements 602 at the distal end 608 of each flexure 444. Optionally, the contact pad 606 may includes a feature 612 formed thereon that defines the contact point between the pad 606 and the ball 406. In one embodiment, the feature 612 is a formed round element extending from the pad 606 towards the center on the element 414.

The flexure 444 is generally fabricated from a resilient and conductive material suitable for use with process chemistries. In one embodiment, the flexure 444 is fabricated from gold plated beryllium copper.

Returning to FIGS. 4A and 5A-B, the clamp bushing 416 includes a flared head 524 having a threaded post 522 extending therefrom. The clamp bushing may be fabricated from either a dielectric or conductive material, or a combination thereof, and in one embodiment, is fabricated from the same material as the housing 402. The flared head 524 includes a flared flat 592 that maintains the flexures 444 at an acute angle relative to the centerline of the contact assembly 250 so that the contact pads 606 of the contact elements 414 are positioned to spread around the surface of the ball 406 to prevent bending, binding and/or damage to the flexures 444 during assembly of the contact assembly 250 and through the range of motion of the ball 406.

The post 522 of the clamp bushing 416 is disposed through a hole 546 in the base 442 and threads into a threaded portion 440 of a passage 436 formed through the adapter 404. A passage 418 formed through the clamp bushing 416 includes a drive feature 420 at an end disposed in the flared head 524. Similarly, the passage 436 includes a drive feature 438 in an end opposite the threaded portion 440. The drive features 420, 438 may be similar to those described above, and in one embodiment, are hexagonal holes suitable for use with a hex driver. The clamp bushing 416 is tightened to a torque that ensures good electrical contact between the contact element 414 and the adapter 404 without damaging the contact element 414 or other component.

One or more slots or cross holes 590 are formed through the head 524 to the passage 418. The cross hole 590 routes at least a portion of the flow of electrolyte through the housing 402 so that the volume within the housing 402 is swept (i.e., the flow is routed so no areas within the housing experience a stagnant or no flow condition), thereby removing sludge or other contaminates that may otherwise accumulate within the housing 402 and eventually lead to poor electrical conduction to the substrate through the ball 406. In one embodiment, the cross holes 590 exit the clamp bushing 416 through the flats 492, thereby directing flow directly on the flexures 444 to ensure contaminants do not accumulate on the contact element 414 or cause the flexure 444 to adhere to the ball 406. Optionally, the passage 418 may be blind and the cross hole 590 coupled to the passage 436, such that the entire flow enters the housing through the cross hole 590 and is swept at a greater rate through the housing 402. Since the fluid inlet to the housing 402 (e.g., the cross hole 590) is opposite the outlet (e.g., the center opening of the seat 426), the entire volume of the housing 402 retaining the ball 406 is swept by electrolyte flow, thereby ensuring that sludge and/or other contaminants do not accumulate within the housing 402, resulting in extended robust electrical performance of the contact assembly 250.

The adapter 404 is generally fabricated from an electrically conductive material compatible with process chemistries, and in one embodiment, is fabricated from stainless steel. The adapter 404 includes an annular flange 432 having a threaded post 430 extending from one side and a boss 434 extending from the opposite side. The threaded post 430 is adapted to mate with the contact plate 320 disposed in recess 208 of the upper plate 236 which couples the respective balls 406 in the contact assemblies 250 to the power source 242.

The boss 434 is received in the second end 410 of the housing 402 and provides a surface for clamping the contact element 414 thereto. The boss 434 additionally includes at least one threaded hole 506 disposed on the side of the boss 434 that engages a fastener 502 disposed through a hole 504 formed in the housing 402, thereby securing the housing 402 to the adapter 404 and capturing the ball 406 therein. In the embodiment depicted in FIG. 5A, three fasteners are shown for coupling the housing 402 to the adapter 404 through counter-sunk holes 504. It is contemplated that the housing 402 and adapter 404 may be fastened by alternative methods or devices, such as staking, adhering, bonding, press fit, dowel pins, spring pins, rivets and retaining rings, among others.

The ball 406 may be solid or hollow and is typically fabricated from a conductive material. For example, the ball 406 may be fabricated from a metal, conductive polymer or a polymeric material filled with conductive material, such as metals, conductive carbon or graphite, among other conductive materials. Alternatively, the ball 406 may be formed from a solid or hollow core that is coated with a conductive material. The core may be non-conductive and at least partially coated with a conductive covering. Examples of suitable core materials include acrylonitrile butadiene styrene (ABS), polypropylene (PP), polyethylene (PE), polystyrene (PS), or polyamide-imide (PAI) (such as TORLON®), and the like. In one embodiment, the ball 406 has a TORLON® or other polymer core coated with a layer of copper or other conductive material.

The ball 406 is generally actuated toward the planarizing surface 364 by at least one of spring, buoyant or flow forces. In the embodiment depicted in FIG. 4, the passages 436, 418 formed through the adapter 404 and clamp bushing 416 are coupled through the upper plate 236 to the electrolyte source 248. The electrolyte source 248 provides electrolyte through the passages 436 and 418 into the interior of the hollow housing 402. The electrolyte exits the housing 402 between the seat 426 and ball 406, thus causing the ball 406 to be biased toward the planarizing surface 364 and into contact with the substrate 122 during processing.

So that the force upon the ball 406 is consistent across the different elevations of the ball 406 within the housing 402, a relief or groove 428 is formed in the interior wall of the housing 402 to accept the distal ends (608 in FIG. 6) of the flexures 444 to prevent restricting the flow of electrolyte passing the ball 406. An end of the groove 428 disposed away from the seat 426 is generally configured to being at or below the diameter of the ball 406 when the ball 406 is in the lowered position.

In one embodiment, electrochemical attack on the contact assembly 250 and/or balls 406 by processing chemistries and contaminant accumulation within the housing 402 may be minimized by keeping a bleeding flow of processing chemistry around the balls all the time substantially prevents self catalytic reaction of the balls in the process chemistry (by removing the catalyst byproduct and other contaminants away from the ball), thus minimizing chemical attack on the balls by eliminating the presence of static process chemistry. Flow is maintained past the ball 406 and out the housing 402 by the path provided by the groove 448 and/or relief hole 446.

In another embodiment, minimizing electrochemical attack and cleaning of the electrical contacts within the housing 402 are facilitated by rinsing the contact assembly 250 and/or balls 406 after processing. For example, a rinsing fluid source 450 may be coupled through a selector valve 452 between the electrolyte source 248 and the contact assembly 250. The selector valve 452 allows a rinsing fluid, such as de-ionized water, to be flowed past the ball 406 during idle periods (when no substrates are being polished on the platen assembly 230) to prevent the ball 406 from being attacked by processing chemistries. It is contemplated that other configurations may be utilized to selectively couple the electrolyte source 248 and the rinsing fluid source 450 to the plenum 206, or that the electrolyte source 248 and the rinsing fluid source 450 may comprise a single fluid delivery system. Keeping a bleeding flow of processing chemistry around the balls all the time substantially prevents self catalytic reaction of the balls in the process chemistry (by removing the catalyst byproduct away from the ball), thus minimizing chemical attack on the balls due by eliminating the presence of static process chemistry.

Figure 7:
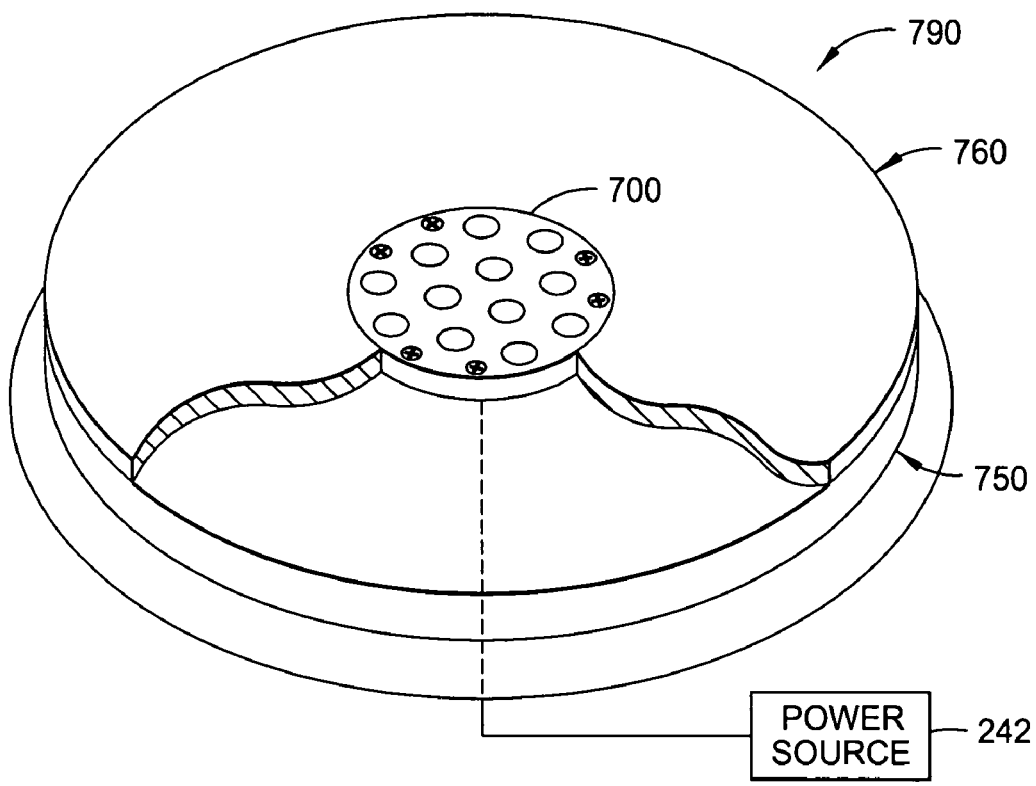
FIG. 7 is a perspective view of another embodiment of a bulk ECMP station.
Figure 8:
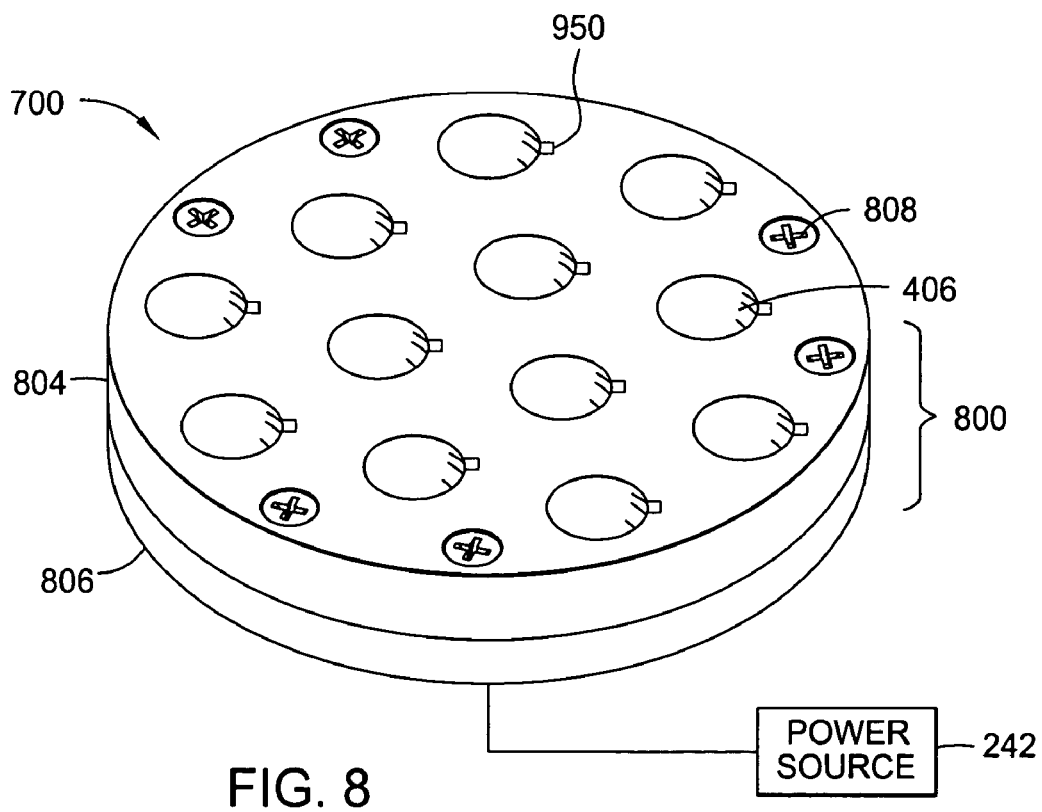
FIGS. 8-9 are perspective and partial sectional views of a contact assembly.
Figure 9:
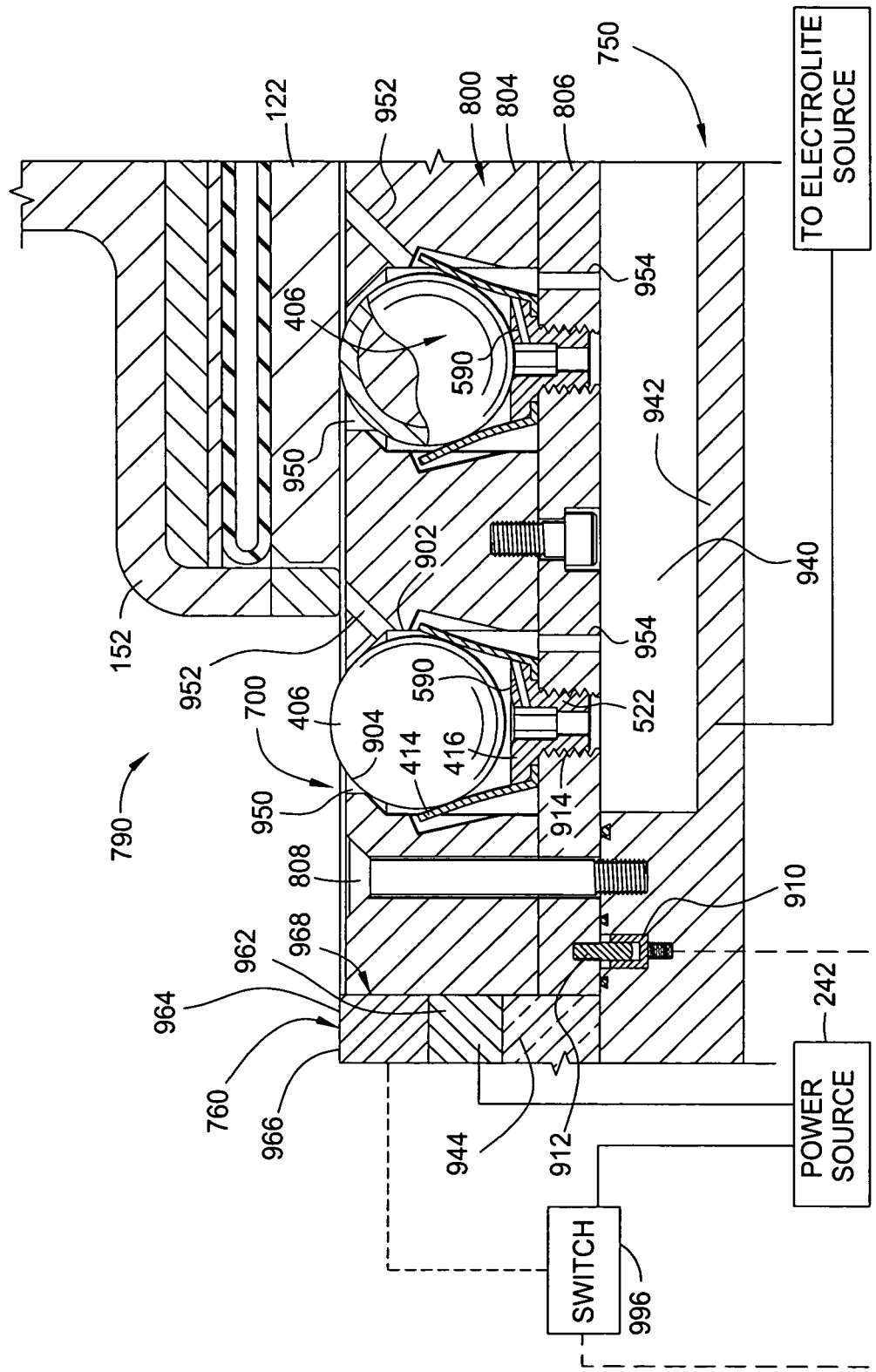

FIG. 7 is a perspective view of another embodiment of an ECMP station 790 having another embodiment of a contact assembly 700 disposed therein, and FIGS. 8-9 are perspective and partial sectional views of the contact assembly 700. The ECMP station 790 includes a platen assembly 750 that supports a processing pad assembly 760 (partially shown in FIG. 7). The platen assembly 750 includes at least one contact assembly 700 projecting therefrom that is coupled to a power source 242. The contact assembly 700 is adapted to electrically bias a surface of the substrate 122 (shown in FIG. 9) during processing. Although one contact assembly 700 is shown coupled to the center of the platen assembly 750 in FIG. 7, any number of contact assemblies may be utilized and may be distributed in any number of configurations relative to the centerline of the platen assembly 750. The contact assembly 700 may also comprise a structure having a conductive upper surface suitable for biasing the substrate 122, as discussed above with respect to FIG. 4.

The processing pad assembly 760 may be any pad assembly suitable for processing the substrate, including any of the embodiments described above. The processing pad assembly 760 may include an electrode 962 and a planarizing layer 966. In one embodiment, the planarizing layer 966 of the processing pad assembly 760 may include a planarizing surface 964 that is dielectric, such as a polyurethane pad. In another embodiment, the planarizing layer 966 of the processing pad assembly 760 may include a planarizing surface 964 that is conductive or made from a conductive composite (i.e., the conduct elements are dispersed integrally with or comprise the material comprising the planarizing surface), such as a polymer matrix having conductive particles dispersed therein or a conductive coated fabric, among others. In the embodiment wherein the planarizing surface 964 is conductive, the planarizing surface 964 and electrode 962 may be coupled to the power source 242 (shown by the dashed lines) via a switch 996 that allows power to be selectively switched between the contact assembly 700 and the conductive planarizing surface 964 to respectively facilitate bulk metal removal and residual metal removal from the substrate 122 without lifting the substrate 122 from the processing pad assembly 760. It is contemplated that the ECMP station 128 may also be similarly configured with a conductive processing pad assembly.

The contact assembly 700 is generally coupled to a conductive contact terminal 910 disposed in the platen assembly 750 and extends at least partially through an aperture 968 formed in the processing pad assembly 760. The contact assembly 700 includes a housing 802 that retains a plurality of balls 406. The balls 406 are movably disposed in the housing 802, and may be disposed in a first position having at least a portion of the balls 406 extending above the planarizing surface 964 and at least a second position where the balls 406 are flush with the planarizing surface 964. The balls 406 are generally suitable for electrically biasing the substrate 122.

The housing 802 is removably coupled to the platen assembly 750 to facilitate replacement of the contact assembly 700 after a number of planarizing cycles. In one embodiment, the housing 802 is coupled to the platen assembly 750 by a plurality of screws 808. The housing 802 includes an upper housing 804 coupled to a lower housing 806 that retains the balls 406 therebetween. The upper housing 804 is fabricated from a dielectric material compatible with process chemistries. In one embodiment, the upper housing 804 is made of PEEK. The lower housing 806 is fabricated from a conductive material compatible with process chemistries. In one embodiment, the lower housing 806 is made of stainless steel or other electrically conductive material. The lower housing 806 is coupled to by a bayonet fitting 912 to the contact terminal 910 which is in turn coupled to the power source 242. The housings 804, 806 may be coupled in any number of methods, including but not limited to, screwing, bolting, riveting, bonding, staking and clamping, among others. In the embodiment depicted in FIGS. 7-9, the housings 804, 806 are coupled by a plurality of screws 908.

The balls 406 are disposed in a plurality of apertures 902 formed through the housings 804, 806. An upper portion of each of the apertures 902 includes a seat 904 that extends into the aperture 902 from the upper housing 804. The seat 904 is configured to prevent the ball 406 from exiting the top end of the aperture 902.

A contact element 414 is disposed in each aperture 902 to electrically couple the ball 406 to the lower plate 806. Each of the contact elements 414 is coupled to the lower plate 806 by a respective clamp bushing 416. In one embodiment, a post 522 of the clamp bushing 416 is threaded into a threaded portion 914 of the aperture 902 formed through the housing 802.

During processing, the balls 406 disposed within the housing 802 are actuated toward the planarizing surface 760 by at least one of spring, buoyant or flow forces. The balls 406 electrically couple the substrate 122 to the power source 242 and contact terminal 910 through the contact elements 414 and lower plate 806. Electrolyte, flowing through the housing 802 provides a conductive path between the electrode 962 and biased substrate 122, thereby driving an electrochemical mechanical planarizing process.

In the embodiment depicted in FIG. 9, a plenum 940 may be formed in a lower plate 942 of the platen assembly 750. An electrolyte source 248 is coupled to the plenum 940 and flows electrolyte to the planarizing surface 760 through the apertures 902 of the contact assembly 700. In this configuration, a top plate 944 may optionally be a unitary component with the lower plate 942. The plenum 940 may alternatively be disposed in the top plate 944 as described above.

To prevent electrochemical attack and prevent accumulation of sludge or other contaminants from degrading the performance of the balls 406 within the housing 802, the contact assembly 700 is configured to maintain a bleed flow of electrolyte out of the housing 802 past the ball 406 and to sweep the interior of the housing 802 with electrolyte flow. For example, one or more grooves 950 and/or relief holes 952 may be formed through the housing 802 allowing flow to exit the housing 802 during conditions where the ball 406 is in contact with the seat 904. Additionally, the clamp bushing 416 may include a cross hole 590 to sweet the portion of the housing 802 as described above with reference to the contact assembly 250. Optionally, the lower housing 806 may include holes 954 formed therethrough to allow electrolyte to sweep alongside the clamp bushing 416, thereby ensuring the entire volume of the housing 802 retaining each ball 406 has no unswept regions.

A portion of an exemplary mode of operation of the processing system 100 is described primarily with reference to FIG. 2. In operation, the substrate 122 is retained in the planarizing head 204 and moved over the processing pad assembly 222 disposed on the platen assembly 230 of the first ECMP station 128. The planarizing head 204 is lowered toward the platen assembly 230 to place the substrate 122 in contact with the planarizing material. Electrolyte is supplied to the processing pad assembly 222 through the outlet 274 and flows into the processing pad assembly 222.

A bias voltage is applied from the power source 242 between the contact assemblies 250 and the electrode 292 of the pad assembly 222. The contact assemblies 250 are in contact with the substrate and apply a bias thereto. The electrolyte filling the apertures 390 between the electrode 292 and the substrate 122 provides a conductive path between the power source 242 and substrate 122 to drive an electrochemical mechanical planarizing process that results in the removal of conductive material, such as copper, disposed on the surface of the substrate 122, by an anodic dissolution method.

Once the substrate 122 has been adequately planarized by removal of conductive material at the first ECMP station 128, the planarizing head 204 is raised to remove the substrate 122 from contact with the platen assembly 230 and the processing pad assembly 222. The substrate 122 may be transferred to one of another ECMP station 128, the second ECMP station 130 or the CMP station 132 for further processing before removal from the planarizing module 106.

Figure 10:
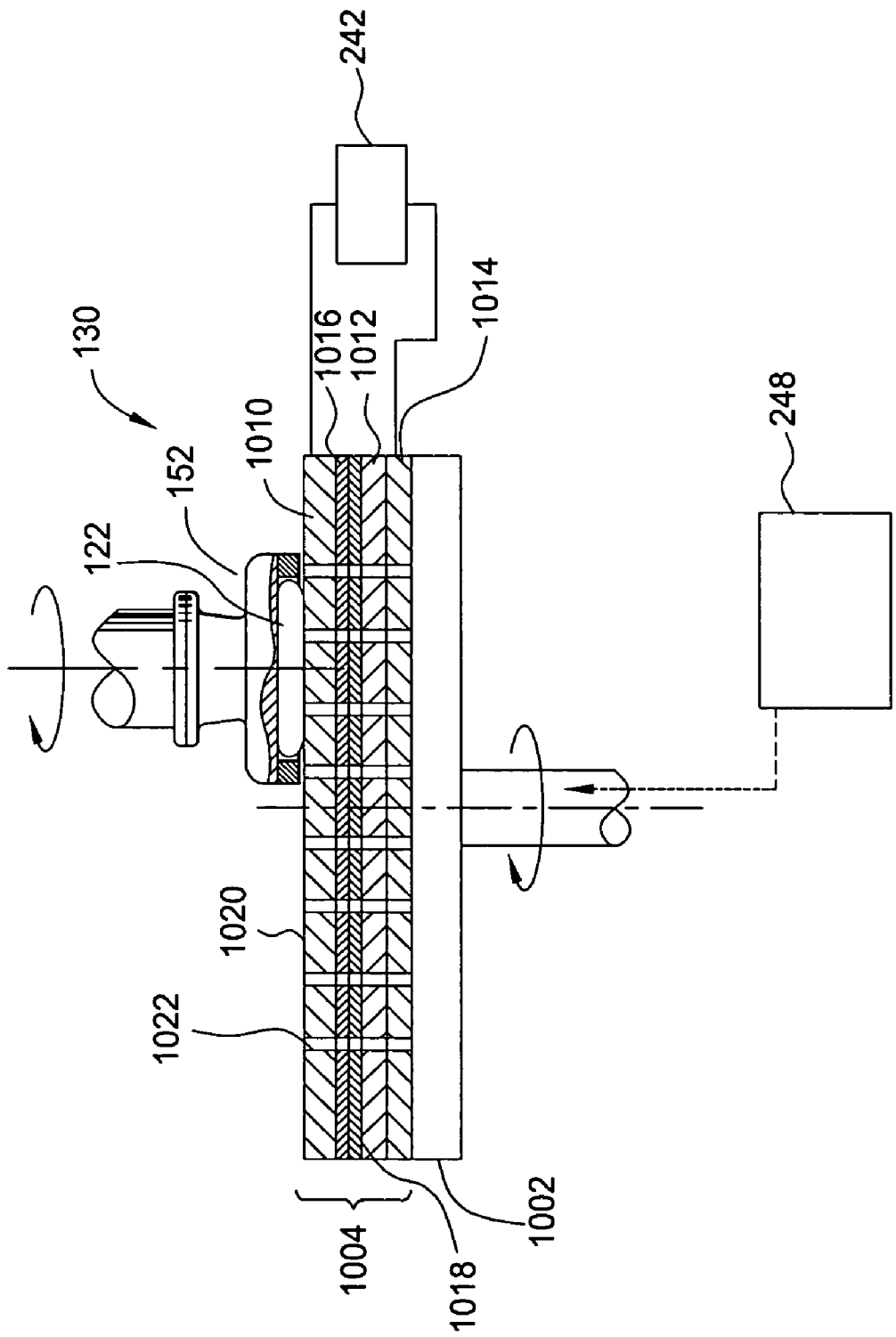
FIG. 10 is a sectional view of one embodiment of a residual ECMP station.

FIG. 10 is a sectional view of one embodiment of the second ECMP station 130. The second ECMP station 130 generally includes a platen 1002 that supports a fully conductive processing pad assembly 1004. The platen 1002 may be configured similar to the platen assembly 230 described above to deliver electrolyte through the processing pad assembly 1004, or the platen 1002 may have a fluid delivery arm 1006 disposed adjacent thereto configured to supply electrolyte to a planarizing surface of the processing pad assembly 1004.

In one embodiment, the processing pad assembly 1004 includes interposed pad 1012 sandwiched between a conductive pad 1010 and an electrode 1014. The conductive pad 1010 is substantially conductive across its top processing surface and is generally made from a conductive material or a conductive composite (i.e., the conductive elements are dispersed integrally with or comprise the material comprising the planarizing surface), such as a polymer matrix having conductive particles dispersed therein or a conductive coated fabric, among others. The conductive pad 1010 and the electrode 1014 may be fabricated like the conductive pad 966 and the electrode 292 described above. The processing pad assembly 1004 is generally permeable or perforated to allow electrolyte to pass between the electrode 1014 and top surface 1020 of the conductive pad 1010. In the embodiment depicted in FIG. 10, the processing pad assembly 1004 is perforated by apertures 1022 to allow electrolyte to flow therethrough. In one embodiment, the conductive pad 1010 is comprised of a conductive material disposed on a polymer matrix disposed on a conductive fiber, for example, tin particles in a polymer matrix disposed on a woven copper coated polymer. The conductive pad 1010 may also be utilized for the contact assembly 700 in the embodiment of FIG. 7.

A conductive foil 1016 may additionally be disposed between the conductive pad 1010 and the subpad 1012. The foil 1016 is coupled to a power source 242 and provides uniform distribution of voltage applied by the source 242 across the conductive pad 1010. Additionally, the pad assembly 1004 may include an interposed pad 1018, which, along with the foil 1016, provides mechanical strength to the overlying conductive pad 1010. The foil 1016 and interposed pad 1018 may be configured similar to the interposed layer 1038 and conductive backing 1036 described above.

Another portion of an exemplary mode of operation of the processing system 100 is described primarily with reference to FIG. 10. In operation, the substrate 122 retained in the planarizing head 204 is moved over the processing pad assembly 1004 disposed on the platen assembly 1002 of the second ECMP station 130. The planarizing head 204 is lowered toward the platen assembly 1002 to place the substrate 122 in contact with the top surface 1020 of the conductive pad 1010. Electrolyte is supplied to the processing pad assembly 222 through the delivery arm 1006 and flows into the processing pad assembly 1004.

A bias voltage is applied from the power source 242 between the top surface 1020 of the conductive pad 1010 and the electrode 1014 of the pad assembly 1004. The top surface 1020 of the conductive pad 1010 is in contact with the substrate and applies an electrical bias thereto. The electrolyte filling the apertures 1022 between the electrode 1014 and the substrate 122 provides a conductive path between the power source 242 and substrate 122 to drive an electrochemical mechanical planarizing process that results in the removal of conductive material, such as copper, disposed on the surface of the substrate 122, by an anodic dissolution method. As the top surface 1020 of the conductive pad 1010 is fully conductive, residual material, such as discrete islands of copper not completely removed through processing at the bulk ECMP station 108, may be efficiently removed.

Once the substrate 122 has been adequately planarized by removal of residual conductive material at the second ECMP station 130, the planarizing head 204 is raised to remove the substrate 122 from contact with the platen assembly 1002 and the processing pad assembly 1004. The substrate 122 may be transferred to another residual ECMP station or one of the CMP station 132 for further processing before removal from the planarizing module 106.

Thus, the present invention provides an improved apparatus and method for electrochemically planarizing a substrate. The apparatus advantageously facilitates efficient bulk and residual material removal from a substrate while protecting process components from damage during idle periods between processing. It is also contemplated that an apparatus arranged as described by the teachings herein, may be configured with solely the bulk ECMP stations 108, with solely the residual ECMP stations 130, with one or more bulk and/or residual ECMP stations 130 arranged in cooperation with a conventional CMP station 132, or in any combination thereof. It is also contemplated that a method and apparatus as described by the teachings herein, may be utilized to deposit materials onto a substrate by reversing the polarity of the bias applied to the electrode and the substrate.

While the foregoing is directed to embodiments of the invention, other and further embodiments of the invention may be devised without departing from the basic scope thereof, and the scope thereof is determined by the claims that follow.

What is claimed is:

1. A contact assembly adapted for electroprocessing a substrate, comprising:
    a housing having at least one passage formed therethrough;
    a ball disposed in the housing and having a processing position partially extending beyond a first surface of the housing;
    a fluid inlet positioned opposite the first surface and adapted to direct a fluid entering the passage to sweep through the passage; and
    a contact element disposed within the housing and having a base and a plurality of conductive flexures extending from the base, the contact element is configured to contact at least a portion of the ball.

2. The contact assembly of claim 1, wherein the housing further comprises:
    a seat formed at an end of the passage proximate a first end of the housing, the seat preventing the ball from extending through the housing.

3. The contact assembly of claim 2, wherein the housing has:
    a groove or a relief hole formed through the housing, the groove or the relief hole allowing the fluid flow to exit the housing.

4. A contact assembly adapted for electroprocessing a substrate, comprising:
    a housing having at least one passage formed therethrough;
    a ball disposed in the housing and having a processing position partially extending beyond a first surface of the housing;
    a fluid inlet positioned opposite the first surface and adapted to direct a fluid entering the passage to sweep through the passage;
    at least one feature formed in the housing allowing the fluid to flow past the ball when the ball is in a position extending furthest beyond the first surface;
    a conductive flexure disposed in the housing and contacting the ball; and
    a conductive adapter coupling the conductive flexure to the housing.

5. The contact assembly of claim 4, wherein the adapter has:
    an axial hole formed therethrough and fluidly coupled to the passage.

6. The contact assembly of claim 4, wherein the adapter has:
    an axial hole formed in the adapter; and
    an adapter passage oriented at an angle to the axial hole and fluidly coupled to the passage formed in the housing.

7. The contact assembly of claim 6, wherein the adapter passage has:
    a cross hole formed in the adapter.

8. The contact assembly of claim 6, wherein the adapter passage has:
    a slot formed in the adapter.

9. The contact assembly of claim 6, wherein the adapter passage is defined at a position that causes flow entering the passage formed through the housing to sweep the passage.

10. The contact assembly of claim 4, wherein the conductive flexure further comprises:
    a base;
    a plurality of legs extending from the base;
    a contact pad defined at an end of each the leg furthest from the base; and
    a rounded feature extending inwardly from the contact pad.

11. A contact assembly for substrate electroprocessing, comprising:
    a housing having at least one passage formed therethrough;
    a conductive ball disposed in the housing and having a processing position partially extending beyond a first end of the housing;
    a retaining feature preventing the ball from exiting the first end of the housing;
    a bleed passage formed in the housing configured to allow a fluid past the ball when disposed against the retaining feature; and
    a contact element disposed within the housing and having a base and a plurality of legs extending from the base, the contact element is configured to contact at least a portion of the ball.

12. The contact assembly of claim 11, wherein the bleed passage is formed around at least one element extending into the passage.

13. The contact assembly of claim 11, wherein the retaining feature is a seat formed in the housing at the first end, and wherein the bleed passage is at least one groove formed in the seat.

14. The contact assembly of claim 11, wherein the bleed passage is a hole formed in the housing at an angle to the passage.

15. The contact assembly of claim 11, wherein the retaining feature is a seat formed in the housing at the first end, and wherein the bleed passage is separated from the seat by a portion of the housing.

16. The contact assembly of claim 10, wherein the conductive flexure further comprises:
    one or more apertures defined adjacent to the contact pad to facilitate flow past the contact element.

17. The contact assembly of claim 1, wherein the conductive flexure further comprises:
    a contact pad defined at an end of each the conductive flexure furthest from the base; and
    a rounded feature extending inwardly from the contact pad.

18. A contact assembly adapted for electroprocessing a substrate, comprising:
    a hollow housing having at least one passage formed therethrough;
    a ball movably disposed in the housing and having at least a portion of the ball extending above a surface of the housing to contact the substrate; and
    a contact element disposed within the hollow housing, the contact element having a base and a plurality of conductive legs extending from the base in a space apart relation, wherein the contact element electrically contacts at least a portion of the ball in the housing.

* * * * *